(12) United States Patent
Campbell et al.

(10) Patent No.: US 8,767,015 B2
(45) Date of Patent: Jul. 1, 2014

(54) SYSTEM AND METHOD OF IMAGE AUGMENTATION

(75) Inventors: Diarmid Archibald Campbell, London (GB); Thomas Lucas-Woodley, London (GB); Nicholas Andrew Lord, London (GB); William Oliver Sykes, London (GB)

(73) Assignee: Sony Computer Entertainment Europe Limited (GB)

( * ) Notice: Subject to any disclaimer, the term of this patent is extended or adjusted under 35 U.S.C. 154(b) by 481 days.

(21) Appl. No.: 13/226,613

(22) Filed: Sep. 7, 2011

(65) Prior Publication Data

US 2012/0081394 A1    Apr. 5, 2012

(30) Foreign Application Priority Data

Sep. 7, 2010   (EP) ..................................... 10175548

(51) Int. Cl.
*G09G 5/00* (2006.01)
(52) U.S. Cl.
USPC .......................................... 345/633; 345/649
(58) Field of Classification Search
None
See application file for complete search history.

(56) References Cited

U.S. PATENT DOCUMENTS

| | | | | | |
|---|---|---|---|---|---|
| 7,315,312 | B2* | 1/2008 | Hemmings | ................... | 345/649 |
| 8,531,420 | B2* | 9/2013 | Ryu et al. | ....................... | 345/173 |
| 8,654,082 | B2* | 2/2014 | Borgward | ...................... | 345/173 |
| 2002/0113802 | A1* | 8/2002 | Card et al. | .................... | 345/619 |
| 2005/0144565 | A1* | 6/2005 | Hemmings | ................... | 715/776 |
| 2006/0033762 | A1* | 2/2006 | Card et al. | .................... | 345/660 |
| 2007/0085845 | A1* | 4/2007 | Kikuchi et al. | ............... | 345/204 |
| 2012/0182310 | A1* | 7/2012 | Okada | ........................... | 345/619 |

* cited by examiner

*Primary Examiner* — Ryan R Yang
(74) *Attorney, Agent, or Firm* — Lerner, David, Littenberg, Krumholz & Mentlik, LLP

(57) ABSTRACT

A method of image augmentation for an image of a book includes capturing an image of the book, detecting at least a portion of at least one fiduciary marker of the book within the image, estimating placement of the book's spine based upon the detected portion of the fiduciary marker, hypothesising possible positions for edges of a rigid leaf being turned in the book based upon estimated placement of the spine, processing the book image to identify edges within the image, comparing elements of the identified edges with the hypothesized positions for edges of the rigid leaf, selecting one of the hypothesized positions that best coincides with the compared elements of the processed image as representative of the position of the rigid leaf being turned in the book, and augmenting the book image with a virtual graphic element arranged in accordance with the selected representative position of the rigid leaf.

15 Claims, 8 Drawing Sheets

SYSTEM AND METHOD OF IMAGE AUGMENTATION

CROSS REFERENCE TO RELATED APPLICATIONS

The present application claims the benefit of and priority to EP Application No. 10175548.6, filed Sep. 7, 2010, the entire disclosure of which is incorporated by reference herein.

BACKGROUND OF THE INVENTION

1. Field of the Invention

The present invention relates to a system and method of image augmentation.

2. Description of the Prior Art

Augmented reality systems are known that use a video camera coupled to a computer to capture a video image, detect features of that captured video image, and then in response to the detected features, generate a graphical overlay to superpose on the captured video image which in some fashion augments the captured video image.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter).

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a to graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of color within a tolerance of the color found near the fiduciary marker), after which the fiduciary marker can be removed.

However, it will be appreciated that in such augmented reality systems, the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made.

SUMMARY OF THE INVENTION

The present invention aims to address or mitigate this problem.

In a first aspect, a method of augmenting an image of a book is provided in claim 1.

In a second aspect, an entertainment device is provided in claim 10.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A system and method of image augmentation are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
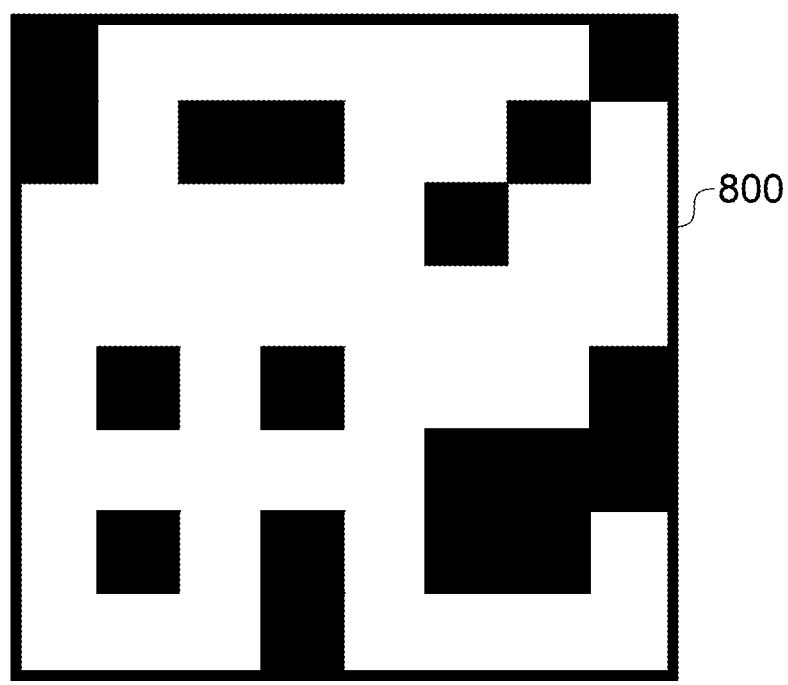
FIG. 1 is a schematic diagram of a fiduciary marker.
Figure 2A:
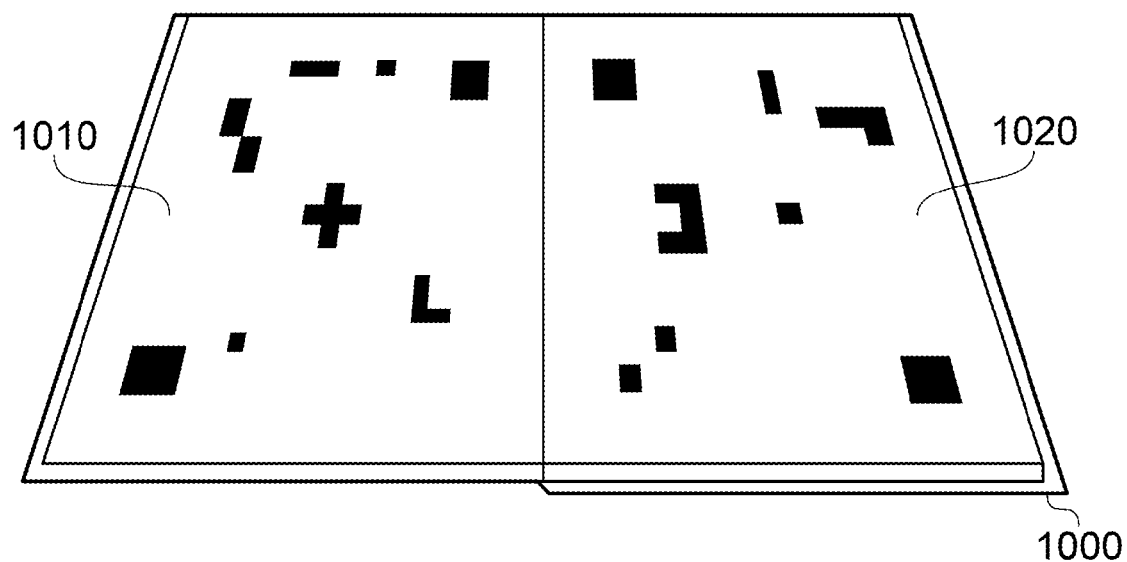
FIG. 2A is a schematic diagram of book comprising a fiduciary marker, in accordance with an embodiment of the present invention.
Figure 2B:
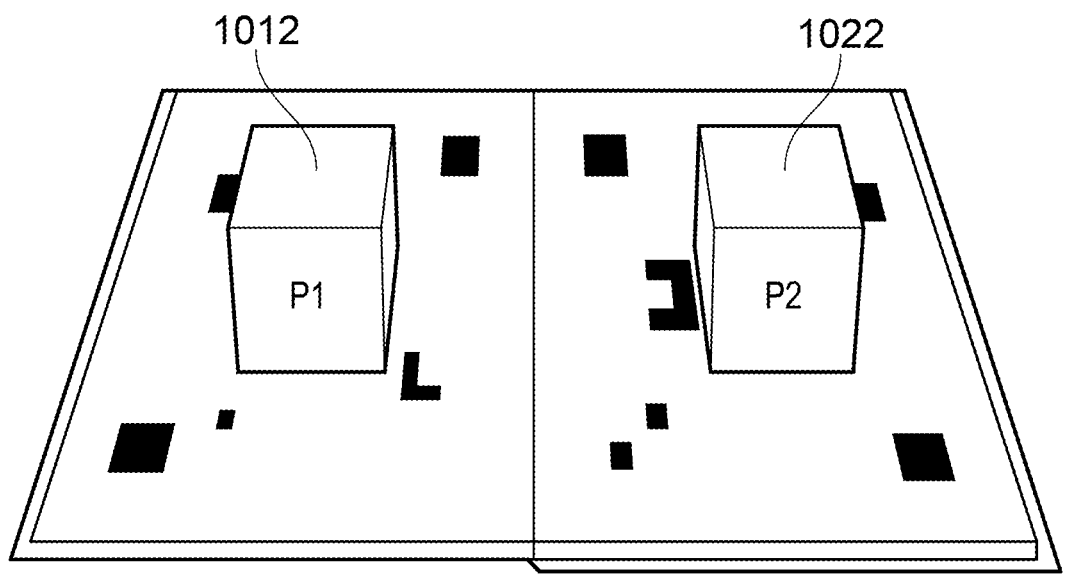
FIG. 2B is a schematic diagram of an image of a book comprising a fiduciary marker upon which a virtual graphic element has been overlaid, in accordance with an embodiment of the present invention.

Referring now to FIGS. 2A and 2B, in an embodiment of the present invention a book 1000 having at least one rigid, turnable leaf (a so-called 'board book') comprises fiduciary markings on each page 1010, 1020, as shown in FIG. 2A.

Hence each page may be considered to be a fiduciary marker, or to comprise or represent one or more fiduciary markers. A leaf will be understood to be a single turnable sheet or panel of a book and to typically comprises a page on each side. Optionally the inside front and/or back covers of the book may also comprise pages that comprise fiduciary markings.

An entertainment device coupled to a video camera can capture an image of the book and detect the fiduciary markings on each visible page to identify those pages of the book. Given this information, the entertainment device can augment the captured video image of the book with pop-up virtual graphic elements 1012, 1022 corresponding to the visible pages 1010, 1020, as shown in FIG. 2B, and output the augmented video image for display. In this way the displayed version of the book becomes a 'magic' pop-up book in which the pages can come to life.

Figure 3:
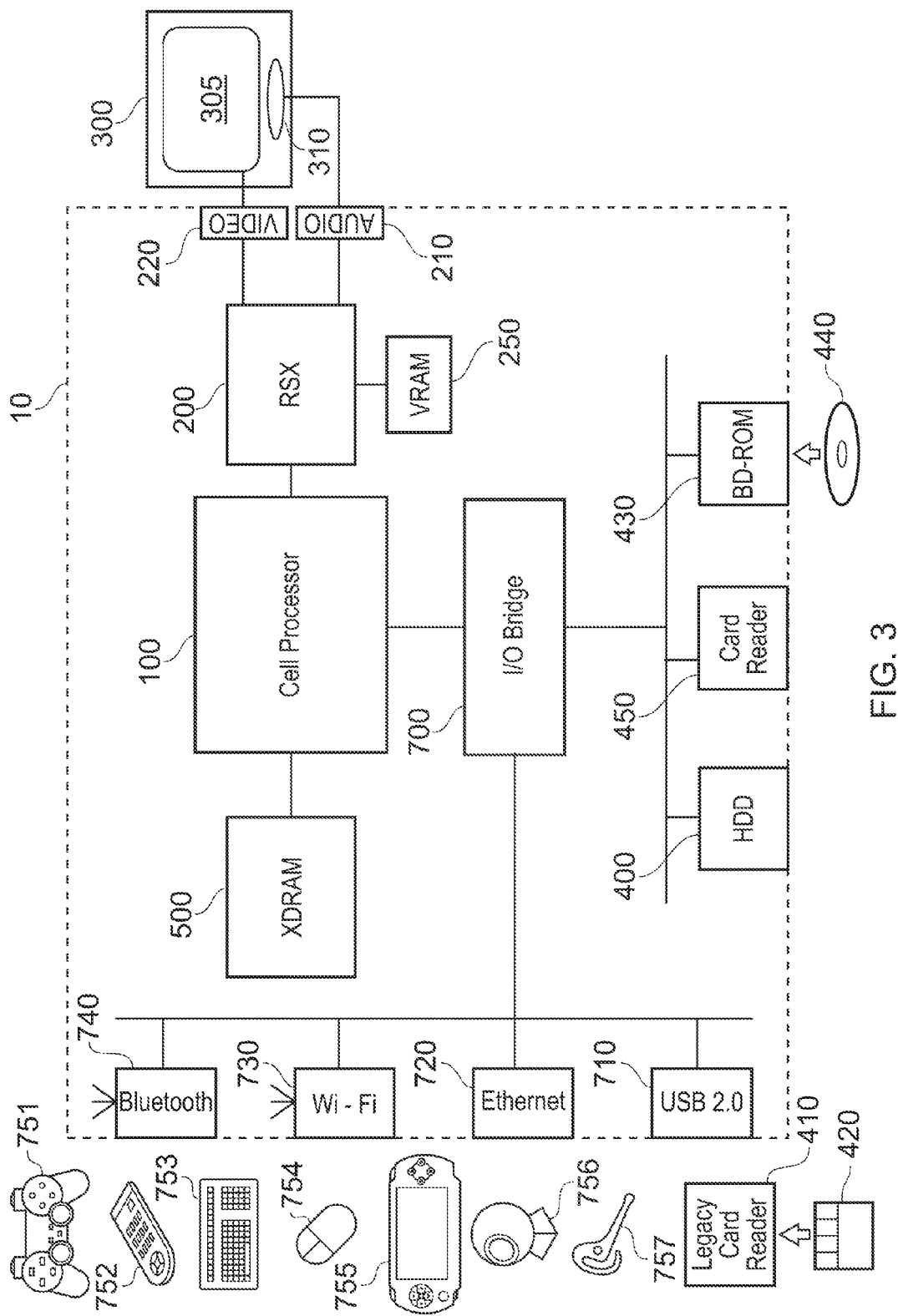
FIG. 3 is a schematic diagram of the architecture of a Sony® Playstation 3® entertainment device.

FIG. 3 schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesizer graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centered on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
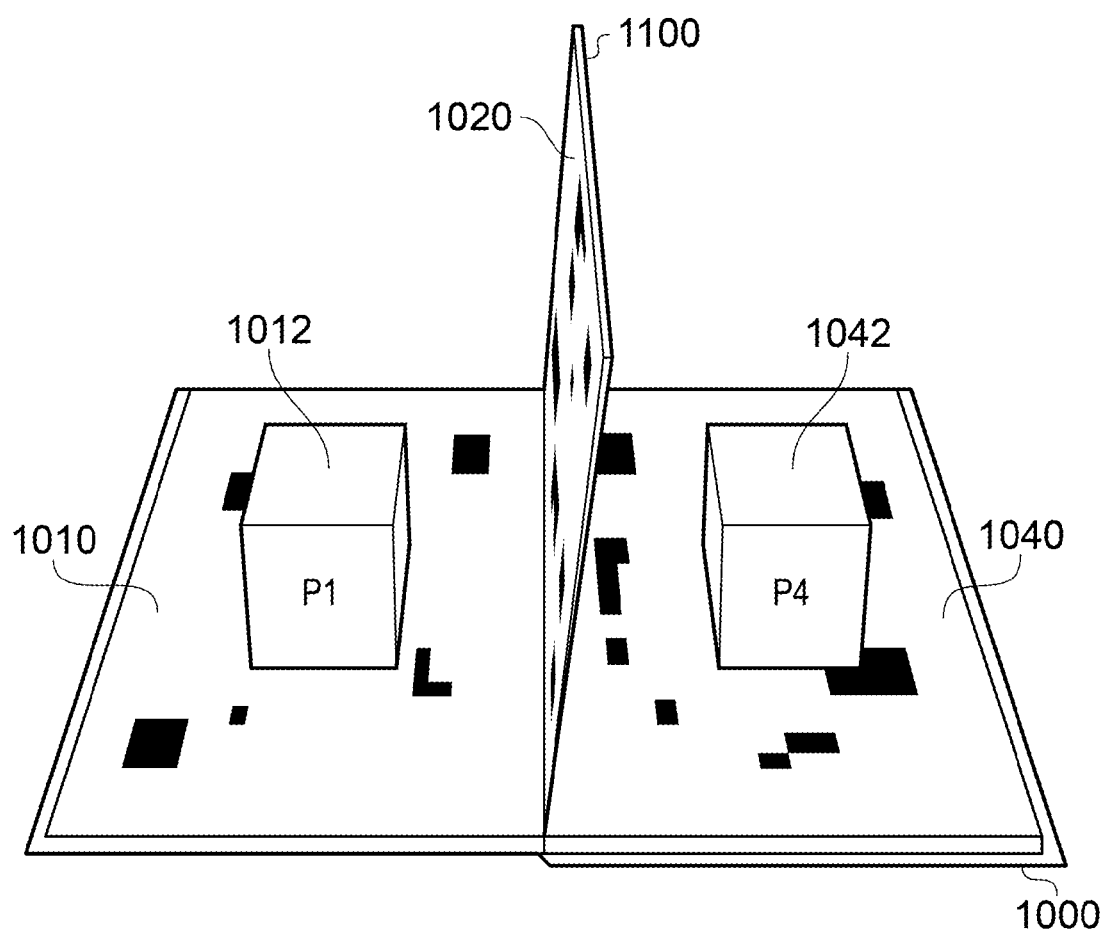
FIG. 4 is a schematic diagram of book comprising a fiduciary marker in which a rigid leaf of the book is being turned, in accordance with an embodiment of the present invention.

Referring now to FIG. 4, it will be appreciated that as a user turns over a rigid leaf 1100 of the board book 1000, then for example pages 1 (1010) and 2(1020) become obscured whilst pages 3 (not shown, but located on the face of the leaf 1100 opposite to page 2) and 4 (1040) are revealed. When the turning action is complete and pages 3 and 4 are fully revealed, the system can provide image augmentation of pages 3 and 4 in a similar manner to that previously described for pages 1 and 2 with reference to FIG. 2B.

The turning of a leaf can be split into two phases. The first phase comprises the obscuring of a visible page on the leaf during turning of the leaf from horizontal to vertical about an axis coincident with the spine of the book. The second phase is the revealing of a new page face on the other side of the leaf during continued turning of the leaf from vertical to horizontal.

It will be understood that for the purposes of explanation the terms 'horizontal' and 'vertical' assume a book that is lying fully open. More generally 'horizontal' equates with 'flat', meaning that a leaf is lying immediately adjacent to another flat leaf or one of the book covers, whilst 'vertical' equates with 'centrally rotated', meaning that the leaf is rotated to be equidistant between the preceding and next leaves (or book covers).

FIG. 4 illustrates a point near the end of the first phase of turning a leaf. It can be seen that as the leaf approaches the vertical position, the fiduciary markings on the visible page (here page 2) become ever more distorted and eventually cannot be resolved or detected by the entertainment device. Meanwhile, the fiduciary markings on page 4 (1040) are slowly revealed, so that there is an initial period where there is not enough of the markings visible to identify the page.

The second phase is a mirror of the first phase, in which the fiduciary markings on the new page face (here page 3, not shown) are initially unresolvable and then become less distorted as the leaf rotates until flat. Meanwhile, the fiduciary markings on page 1 are gradually obscured by the leaf until the page can no longer be identified.

As a result there are periods during the turning of the leaf where the fiduciary markings on its pages cannot be resolved, and so the entertainment device cannot apply graphical augmentations to these pages (such as, for example, a pop-up picture folding up or down) based upon a direct recognition of the fiduciary marker or markers.

However, it is still desirable to maintain the illusion of a 'magical' pop-up or interactive book even as the leaf is being turned.

In an embodiment of the present invention, the assumption is made that during the process of turning a leaf of a book, at least one fiduciary marker may remain sufficiently visible to enable detection (i.e. enough of its markings are visible for the marker to be identifiable among a set of possible markers associated with the book). Typically this will be the fiduciary marker on a page that currently forms an obtuse angle with the turning leaf of the book. Thus in the first phase of turning the leaf, in the example above this will be the fiduciary marker on page 1, whilst in the second phase of turning the leaf, in the example above it will be the fiduciary marker on page 4.

Notably in either the first or second stage of turning the leaf, the assumed visible fiduciary marker may still be partially occluded by the user's hand (e.g. at the base of the book near the user). However, preferably the markings on each page are designed with enough redundancy that the marker is recognizable despite partial occlusion of this kind.

It will be appreciated that identifying one fiduciary marker and hence one page number enables the PS3 to calculate the corresponding page number(s) of the visible or partially visible pages, and hence what graphical overlay if any is required for each visible page. Thus for example in FIG. 4, if the fiduciary markings on page 1 can be identified then the PS3 can calculate that the turning leaf contains pages 2 and 3 and that the newly revealed page is page 4.

Meanwhile, the physical relationship between the fiduciary marker of a page and the page itself, and hence also the physical relationship between the fiduciary marker of a page and at least part of the book (such as the spine) are known in advance.

As a non-limiting example, it may be predetermined that the fiduciary marker extends to within 2 centimeters of the edge of a page on all four sides. Therefore an estimation of the position, rotation and preferably distance and tilt of the fiduciary marker can also provide corresponding estimations for the page itself.

Similarly when flat, the page exists in a fixed physical relationship to at least that part of the book on the same side of the spine as the page (assuming no damage), and so the to fiduciary marker can also provide corresponding estimations for at least part of the book up to the spine.

Alternatively or in addition, the position of the spine can be assumed to correspond to the inner long edge of the page regardless of whether the book is fully open.

Thus in an embodiment of the present invention it is assumed that the PS3 can detect at least a portion of at least one fiduciary marker of the book within the captured video image, and this serves to identify a page number corresponding to the fiduciary marker, and hence also provides the position, rotation and preferably distance and tilt of the fiduciary marker and the page it is on, as described previously herein.

Consequently it is possible to estimate a placement of the spine of the book in the image based upon the detected at least portion of the at least one fiduciary marker and hence also the position of the axis of rotation of the turning leaf of the book, which rotates around the spine.

Given the position of the axis of rotation of the turning leaf of the book, and in addition the size of that leaf and the fact that it is substantially rigid, it then becomes possible for the system to hypothesize positions for the leaf as it is turned over in the book.

In particular, it becomes possible to hypothesize a plurality of possible positions for the free edges of that leaf as it is being turned in the book (i.e. those edges not bound to the spine), based upon the estimated placement of the spine and the known size of the leaf.

In an embodiment of the present invention one hypothesis is given for each degree of rotation of the leaf within a given angular range, thereby generating a plurality of candidate hypotheses for the position of the rigid leaf and its edges. The range may be predetermined, for example being ±30 degrees from the vertical/central position, or may be reactive to the last known angle of the leaf before identification of the fiduciary marker on the visible page of the leaf was lost.

It will be appreciated that the predetermined range may be selected by the skilled person in response to a number of factors, including the nature of the fiduciary markers, the resolution of the video camera and the size of the book, and may range from any value to between ±89 degrees and ±1 degree from vertical, but may typically range between ±45 degrees.

Similarly it will be appreciated that greater or fewer hypothetical positions for the turning leaf may be proposed, for example ranging between 10, 5, 1 or 0.1 degree steps and may be linearly or non-linearly spaced. The number of hypotheses represents a trade-off between computational overhead and accuracy, as will be seen below.

Figure 5:
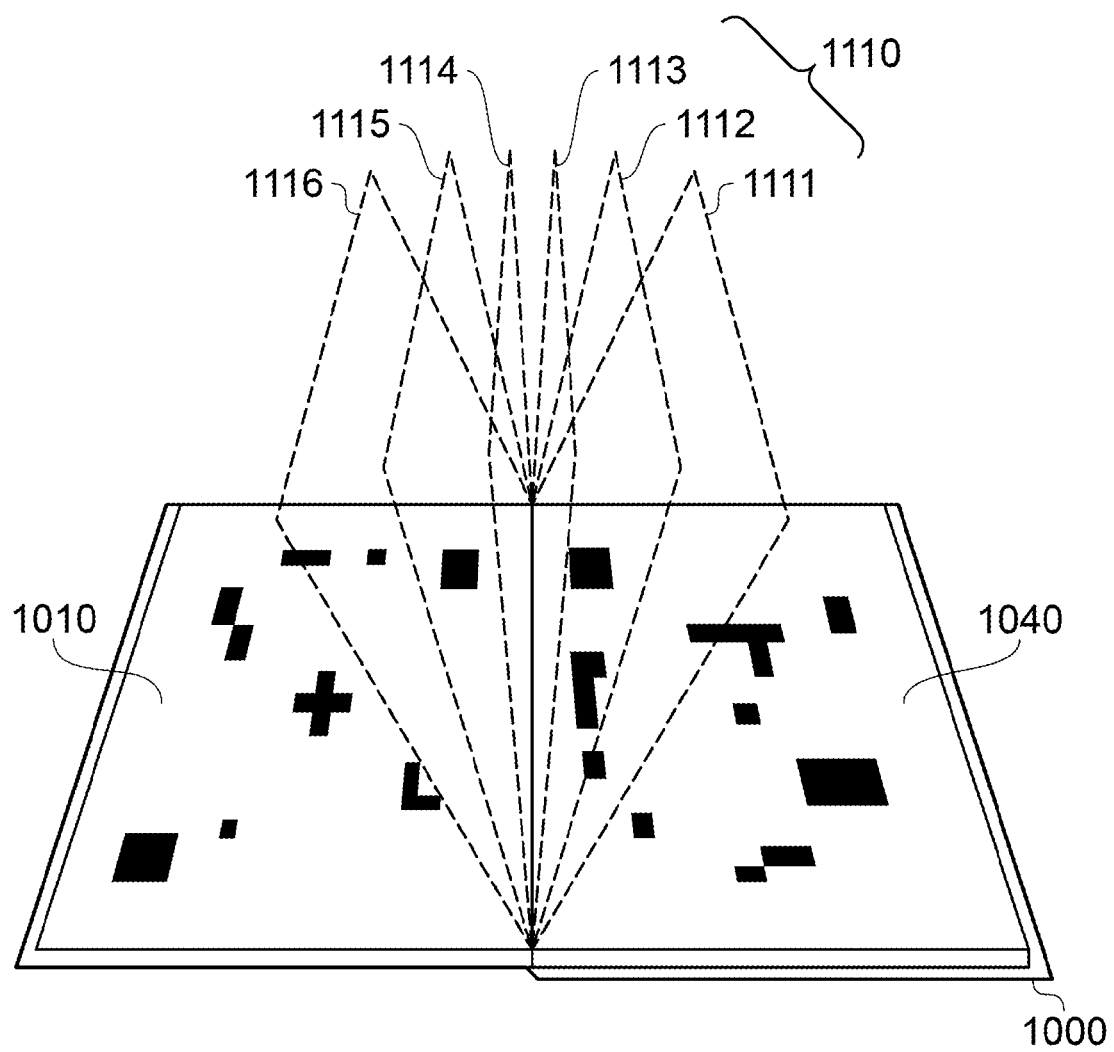
FIG. 5 is a schematic diagram of book comprising a fiduciary marker for which a plurality of hypothetical positions for the turning rigid leaf of the book is estimated, in accordance with an embodiment of the present invention.

Referring now to FIG. 5, each candidate hypothesis comprises the possible positions of the three free edges of the turning leaf at a given angle of rotation about the spine, represented by dotted lines 1111, 1112, 1113, 1114, 1115 and 1116 for six example candidate hypotheses 1110 in FIG. 5.

The PS3 then determines which candidate hypothesis best matches the actual position of the turning leaf as follows.

In an embodiment of the present invention, the captured video image of the book is image processed (for example by the Cell processor 100, or alternatively by or in conjunction with the Reality Synthesiser graphics unit 200) to generate a so-called edge-image in which only edges (each representing a predetermined threshold transition between regions of colour and brightness) are identified.

An example method of processing the video image of the book to generate such edges within the edge-image is to apply the well known Canny edge detector to the video image. See for example http://en.wikipedia.org/wiki/Canny_edge_detector.

Figure 6:
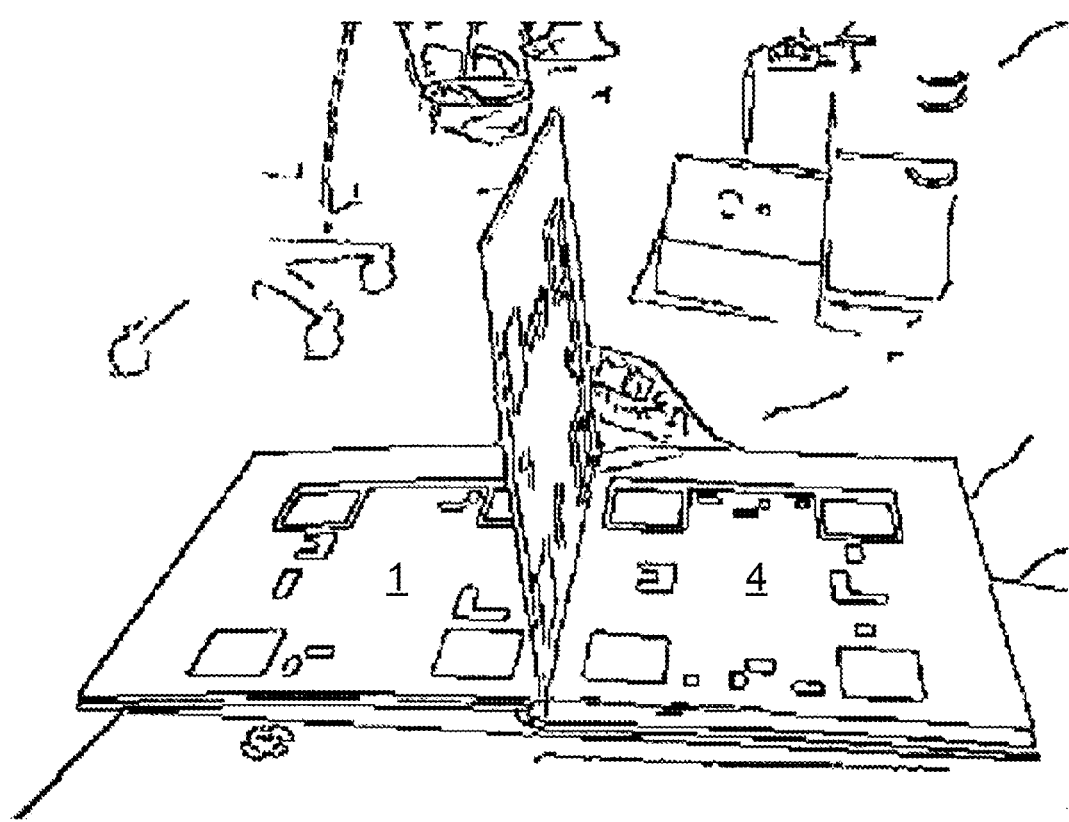
FIG. 6 is a schematic diagram of a so-called 'edge image', in accordance with an embodiment of the present invention.

The resulting edge-image shows (by way of an arbitrary convention) edges as black pixels and non-edges as white pixels. An example edge-image of a book according to an embodiment of the present invention is given in FIG. 6, with page numbers '1' and '4' labelled.

Next, the edge-image is analyzed to determine the direction of each edge within it. An example method to achieve this is to apply the well known Sobel operator, from which the angular direction of an edge can be obtained. See for example http://en.wikipedia.org/wild/Sobel_operator and again also http://en.wikipedia.org/wiki/Canny_edge_detector. In particular, the orientation of identified edge elements can be estimated based upon their response to horizontal and vertical Sobel operators.

It is then possible to compare elements of the identified edges of the processed image (i.e. the edge image) with the plurality of hypothesised edge positions for the turning leaf. As noted above, each candidate hypothesis comprises three lines representing the three free edges of the rigid turning leaf. For each such line $L_j$ of the plurality of candidate hypotheses, in principle a score is calculated for each edge pixel $P_i$ in the edge image.

In general, this score may be based upon the probability of the edge pixel $P_i$ lying along the line $L_j$. In particular, this score may depend upon the relative angle between the local angular direction at an edge pixel $P_i$ (as identified by the Sobel operator) and the slope or angle of the line $L_j$, and furthermore upon the distance between the pixel $P_i$ and the line $L_j$.

For efficiency, however, preferably only pixels that are close to a line $L_j$ need to be evaluated in this manner Consequently it will be appreciated that not all edge pixels need necessarily be evaluated. What 'close' means depends upon the resolution of the captured video image and hence the resolution of the edge image, the size of the book within that image, and the angular separation of hypotheses for the turning leaf of the book.

For example, 'close' may mean the distance, in pixels, equivalent to half the separation distance between two lines hypothesising the outside edge of the turning leaf closest to the vertical position and at the next hypothesised position on either side (i.e. at the maximum separation between hypothesised lines).

However, other distances in pixels may nevertheless be chosen by a designer in response to other factors, such as a wish to reduce computational overhead when analyzing a high resolution edge image, or where the image is noisy. For example, in an embodiment of the present invention, the edge pixels are only scored if they coincide with a hypothesised line, and so the correspondence of the local angular direction (as derived by the Sobel operator) becomes the main scoring criterion for these pixels.

In other words, a candidate hypothesised edge (e.g. a line $L_j$) is scored responsive to the relative angle between the line $L_j$ and an estimated orientation of the identified edge element (e.g. an edge pixel $P_i$), and optionally further responsive to its proximity to the identified edge element.

A relatively efficient method by which to identify edge pixels for scoring is to use the well known Bresenham's line drawing algorithm (See http://en.wikipedia.org/wiki/Bresenham%27s_line_algorithm) to calculate the position of edge-image pixels corresponding to each hypothetical line. In other words, the pixel positions of the candidate hypothesised edges within the processed image (edge-image) are approximated by using a line drawing algorithm. However, instead of actually drawing the hypothetical line itself, edge pixels in the edge image are then scored with respect to each pixel point identified using the line drawing algorithm. It is still possible to incorporate a spatial tolerance (i.e. score edge pixels close by) by modifying Bresenham's line drawing algorithm to generate a thicker line.

The cumulative scores for the each of the respective three lines representing each candidate hypothetical position of the turning leaf are summed together to give each candidate hypothetical position a total score with respect to the edge-image.

The candidate hypothesis with the highest cumulative score can therefore be selected as the one that best coincides with the edge-image (or at least the compared elements of the edge-image). This selected hypothesis is then taken to be representative of the position of the rigid leaf being turned in the book.

This process is repeated, for example at the video frame rate of the output display (typically 50 or 60 Hertz), although other frequencies may be considered, for example to reduce computational overhead.

A high frequency repetition of the process can provide additional information regarding the rate of rotation of the leaf based upon the change in angle of successive selected hypotheses. This can be used to reduce computational overhead further, by starting the testing of hypotheses at an expected position based upon the measured rate of rotation, and radiating out on either side of this position until a hypothesis with local maximum score is identified. This hypothesis can then be selected, thereby reducing the number of hypotheses tested.

Either way, the turning leaf can be tracked and the image of the book and the leaf can be augmented by a virtual graphic element arranged in accordance with the selected representative position of the leaf, and corresponding to the identified or calculated page numbers, as described previously.

In particular, this virtual graphic element may change as a function of the position of the turning leaf, not only in terms of position, rotation or scale coordinates, but in terms of animation steps coupled to the turning leaf's relative position with respect to the other visible pages of the book.

For example, a virtual graphic element may have a pop-up animation associated with it, so that the depicted item is seen to unfold or assemble in some manner as the page is opened, and conversely fold or disassemble as the page is closed. In a similar manner, a monster or other character may be seen to come out of a hole in a page so as to be on top of the page once the page is fully open.

It will be appreciated that similarly the flat pages being newly revealed or occluded by the turning leaf may also animate virtual graphic elements in response to the position of the turning leaf as represented by the within hypothesis.

Finally it will be similarly appreciated that a virtual graphic element may be coupled to adjoining pages and responsive to the relative angular position of the pages; for example a turning leaf may reveal a rainbow spanning two pages, with the arc of the rainbow subtending the angle between a flat page and the turning leaf, or the monster or other character described previously may be animated so as to appear to be pushing the leaf over.

In an embodiment of the present invention, the display 305 is a stereoscopic display, and the video camera is a stereoscopic video camera operable to capture left and right images forming a stereoscopic pair. It will be understood that the different respective viewpoints of the left and right images result in a relative displacement between corresponding objects of the left and right images that is related to the distances of those objects, and the user perceives apparent depth in the resulting stereoscopic image due to these displacements.

The PS3 is able to determine the position of at least part of the book and estimate the position of a turning leaf of the book in a similar manner to that described previously herein, for at least a first of the left or right images of the stereoscopic pair of images. Moreover, the relative displacement of the book (or of sections of the book such as corners) between the left and right hand image can be determined either from comparing the images themselves (e.g. block matching or cross-correlation of the left and right images) or by repeating the determination of the position based on fiduciary markers in the second of the left or right images of the stereoscopic pair of images, and comparing this with the position in the other image.

In other words, where the captured image is a stereoscopic image comprising a first monoscopic image and second monoscopic image, an image augmentation means such as the to PS3 is responsive to a displacement between elements of the first monoscopic image and second monoscopic image (such as the fiduciary markers) to generate a second virtual graphic element to stereoscopically augment the second monoscopic image.

In this way the displacements required between corresponding virtual graphic elements superposed on the left and right image can be chosen to match those of the book (at least at the supposed point of contact with a page of the book) so that the apparent depth of the virtual graphic elements properly match those of the captured images of the book. It will be appreciated that other aspects of three-dimensional graphic display (such as relative rotation of a corresponding virtual graphic element for the respective viewpoints of the stereoscopic image for a given displacement) are well known and are not described in detail here.

Figure 7:
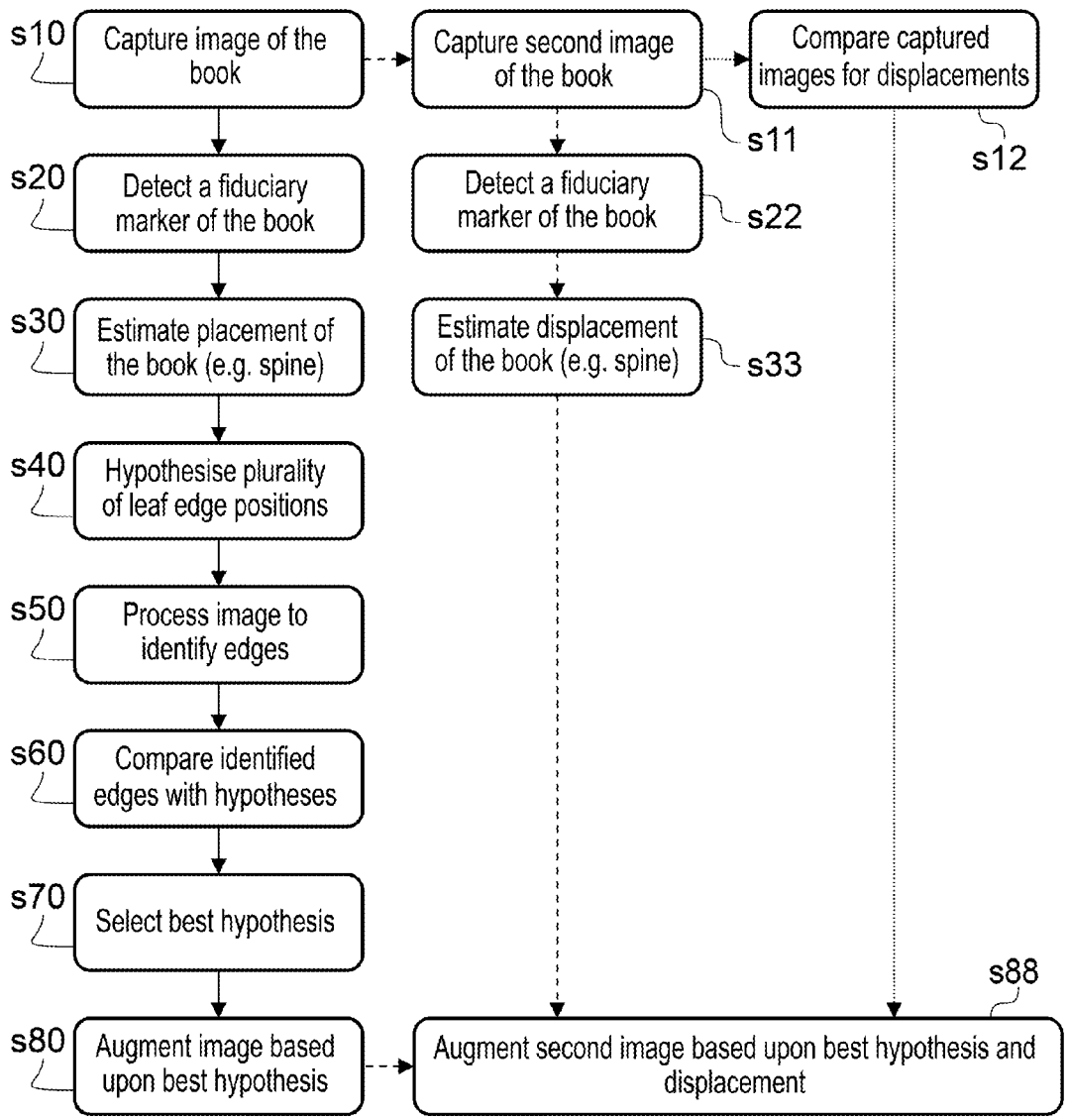
FIG. 7 is a flow diagram of a method of image augmentation in accordance with an embodiment of the present invention.

Referring now to FIG. 7, a summary example of a method of augmenting an image according to an embodiment of the present invention is described.

In a first step s10, a scene comprising the book is captured by a video camera or similar image capture device operably coupled to an image input of the PS3 (such as a USB port), resulting in an image including the book. As noted previously, the book itself has at least one substantially rigid leaf.

In a second step s20, the PS3 attempts to detect fiduciary markings in the image (i.e. those visible in the book), for example using the Cell processor operating under suitable software instruction as a marking detector. As noted previously, typically not all of a fiduciary marker is required to identify it; for example there is typically some form of spatially distributed redundancy in its markings.

In a third step s30, the image or partial image of the of the fiduciary marker on a page of the book is compared with a reference version of the marker to determine orientation and scale, and given a known physical relationship to the page this also provides an estimate of the orientation and scale of the book and in particular the placement of the spine of the book, which acts at the origin of rotation for the one or more leaves of the book. Again the Cell processor may perform the comparison and estimate the placement of the spine of the book, and the reference versions of the markers may be stored in RAM, on the hard disc, on an optical disk or on remote storage, or any other suitable storage medium or combination thereof.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Again here the Cell processor may operate as the hypothesising means.

To provide a basis of comparison with these hypotheses, in a fifth step s50 the captured image is processed to generate an image in which edges are identified. In addition data indicating the directions of these edges is generated. The image processing may be performed by the Cell processor, the Reality Synthesiser graphics unit or a combination of the two.

In a sixth step s60, the hypothesised edges of the turning leaf of the book are each evaluated with respect to the image comprising the identified edges and the directions of these edges using one of several possible scoring criteria as described previously. Again this evaluation or comparison may be performed using the Cell processor operating under suitable software instruction. As noted previously, it is typically not necessary to compare each hypothesised edge with all the pixels of the processed image.

In a seventh step s70, the hypothesis whose predicted free edges of the turning leaf generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Other possible steps are shown in FIG. 7 using dashed arrows. These include steps 11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for example by the Cell processor.

It will be appreciated that the above steps need not necessarily all be implemented in the above order. For example, the fifth step s50 may occur immediately after the first step s10.

As noted above, it will be appreciated that the methods disclosed herein may be carried out on conventional hardware suitably adapted as applicable by software instruction, or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realized in hardware as an ASIC (application specific integrated circuit) or an FPGA (field programmable gate array) or other configurable circuit suitable to use in adapting the conventional equivalent device.

We claim:

1. A method of image augmentation for an image of a book, the book having at least one substantially rigid leaf, the method comprising the steps of:
   capturing an image of the book;
   detecting at least a portion of at least one fiduciary marker of the book within the image;
   estimating a placement of a spine of the book in the image based upon the detected at least the portion of the at least one fiduciary marker;
   hypothesising a plurality of possible positions for edges of a rigid leaf being turned in the book based upon the estimated placement of the spine of the book;
   processing the image of the book to identify edges within the image;
   comparing elements of the identified edges of the processed image with the hypothesised plurality of possible positions for edges of the rigid leaf;
   selecting one of the hypothesised plurality of possible positions for edges of the rigid leaf that best coincides with the compared elements of the processed image as representative of the position of the rigid leaf being turned in the book; and
   augmenting the image of the book with a virtual graphic element arranged in accordance with the selected representative position of the rigid leaf.

2. A method according to claim 1, in which the step of hypothesising the plurality of possible positions for edges of the rigid leaf comprises generating one hypothesis for edges of the rigid leaf per unit of rotation of the leaf about the spine, where a unit lies in the range between 0.1 degree and 10 degrees.

3. A method according to claim 1 in which the step of processing the image of the book to identify edges within the image uses the Canny edge detector.

4. A method according to claim 1, in which the step of comparing elements of the identified edges of the processed image with the hypothesised plurality of possible edge positions comprises the step of:
   scoring a candidate hypothesised edge responsive to the relative angle between the candidate hypothesised edge and an estimated orientation of the element of the identified edge.

5. A method according to claim 4 in which scoring a candidate hypothesised edge is further responsive to its proximity to an identified edge element.

6. A method according to claim 4, in which the step of scoring a candidate hypothesised edge comprises the step of:
   estimating the orientation of identified edge elements based upon their response to a horizontal Sobel operator and a vertical Sobel operator.

7. A method according to claim 4, in which the step of selecting a hypothesis comprises the step of:
   summing the scores for each candidate hypothesised possible position for edges of the rigid leaf and selecting the candidate hypothesis with the highest score as representative of the position of the rigid leaf.

8. A method according to claim 1, in which the captured image is a stereoscopic image comprising a first monoscopic image and second monoscopic image, and the step of augmenting the image of the book comprises arranging a virtual graphic element in the second monoscopic image responsive to a displacement between elements of the first monoscopic image and second monoscopic image.

9. A tangible, non-transitory computer program product comprising a storage medium on which is stored computer readable program code, the program code, when executed by a processor, cause the processor to perform a method of image augmentation for an image of a book, the book having at least one substantially rigid leaf, the method comprising the steps of:

capturing an image of the book;

detecting at least a portion of at least one fiduciary marker of the book within the image;

estimating a placement of a spine of the book in the image based upon the detected at least the portion of the at least one fiduciary marker;

hypothesising a plurality of possible positions for edges of a rigid leaf being turned in the book based upon the estimated placement of the spine of the book;

processing the image of the book to identify edges within the image;

comparing elements of the identified edges of the processed image with the hypothesised plurality of possible positions for edges of the rigid leaf;

selecting one of the hypothesised plurality of possible positions for edges of the rigid leaf that best coincides with the compared elements of the processed image as representative of the position of the rigid leaf being turned in the book; and augmenting the image of the book with a virtual graphic element arranged in accordance with the selected representative position of the rigid leaf.

10. An entertainment device comprising:

an image input operable to receive a captured image of a book;

a marking detector operable to detect at least a portion of at least one fiduciary marker of the book within the image;

a placement estimator operable to estimate a placement of a spine of the book in the image based upon the detected at least the portion of the at least one fiduciary marker;

a processor arranged in operation to hypothesise a plurality of possible positions for edges of a rigid leaf being turned in the book based upon the estimated placement of the spine of the book;

a image processor operable to process the image of the book to identify edges within the image;

a comparator operable to compare elements of the identified edges of the processed image with the hypothesised plurality of possible positions for edges of the rigid leaf;

a selector operable to select one of the hypothesised plurality of possible positions for edges of the rigid leaf that best coincides with the compared elements of the processed image as the hypothesis representative of the position of the rigid leaf being turned in the book; and an image augmentation processor operable to augment the image of the book with a virtual graphic element arranged in accordance with the selected representative position of the rigid leaf.

11. An entertainment device according to claim 10, in which the processor arranged in operation to hypothesise is operable to generate one hypothesis per unit of rotation of a leaf about the spine, where a unit lies in the range between 0.1 degree and 10 degrees.

12. An entertainment device according to claim 10, in which the comparator is operable to score a candidate hypothesised edge responsive to the relative angle between the candidate hypothesised edge and an estimated orientation of the identified edge element.

13. An entertainment device according to claim 12 in which the comparator is operable to score a candidate hypothesised edge further responsive to its proximity to an identified edge element.

14. An entertainment device according to claim 12, in which the comparator approximates pixel positions of the candidate hypothesised edge within the processed image using a line drawing algorithm.

15. An entertainment device according to claim 10, in which the captured image is a stereoscopic image comprising a first monoscopic image and second monoscopic image, and the image augmentation processor is responsive to a displacement between elements of the first monoscopic image and second monoscopic image to generate a second virtual graphic element to augment the second monoscopic image.

* * * * *